Patented June 4, 1946

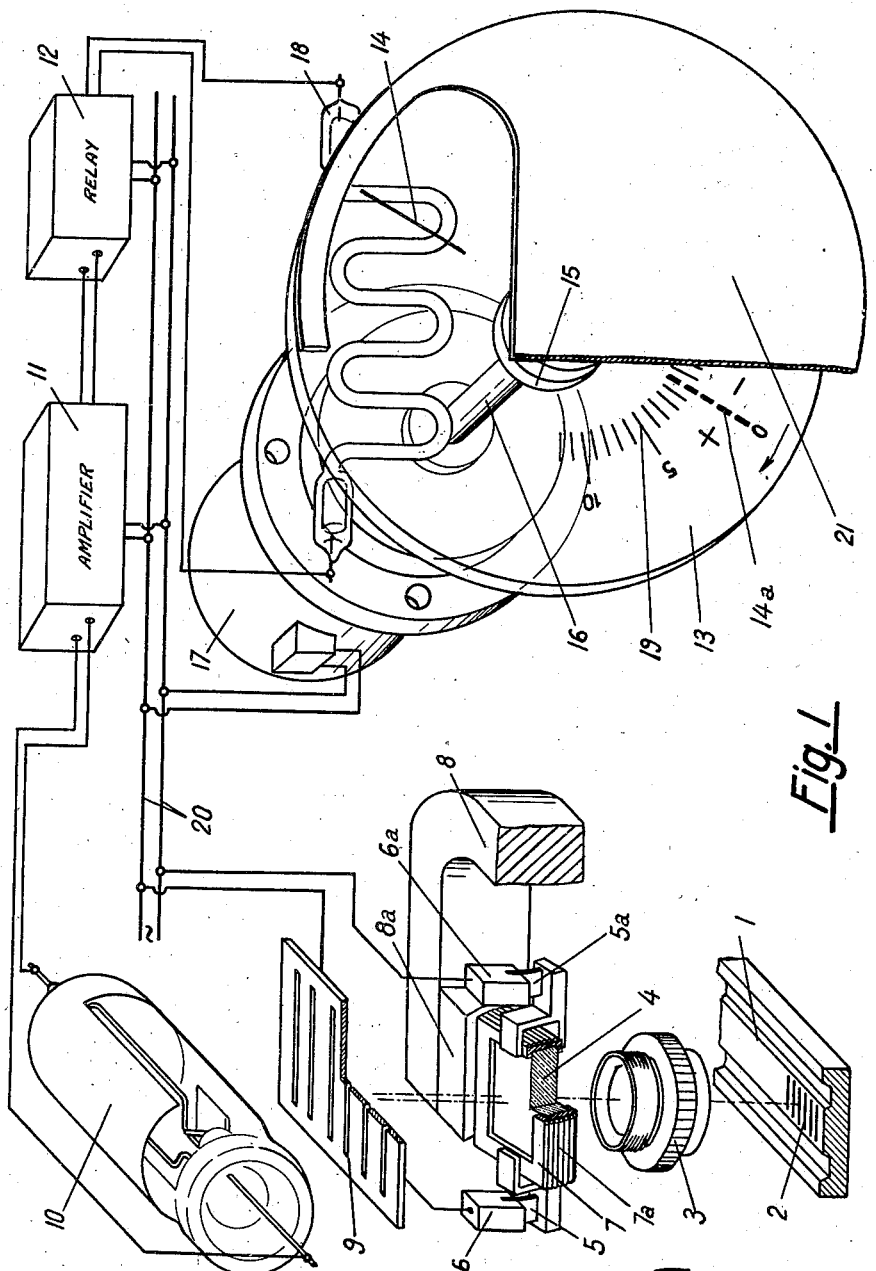

2,401,712

UNITED STATES PATENT OFFICE 2,401,712

DEVICE FOR DETERMINING ELECTRICALLY THE POSITION OF OBJECTS

Fernand Turrettini, Bellevue-Geneva, Switzerland, assignor to Societe Genevoise d'Instruments de Physique, Geneva, Switzerland, a firm of Switzerland Application June 5, 1942, Serial No. 445,924
In Switzerland July 22, 1941

3 Claims. (Cl. 250—41.5)

The technique applied up to now for resolving the problem of the determination of the position of an object, for instance of a scale, of a graduated machine slide, consists in observing visually their position in the field of a microscope generally provided with a micrometer used for measuring the position of the object.

The precision of this method is limited by the following considerations:

The enlargement of the microscope enlarges the real dimensions of the object, as well as the variations of its position, which are to be measured. The enlargement is necessarily limited, in order that the object thus enlarged may not take inconvenient dimensions and that its image remains sufficiently clearly outlined.

The measurements are effected visually by appreciating in the field of the microscope the coincidence of a movable index, under the action of a micrometer, with the image of the object in observation.

The visual acuteness and the physiological fatigue of the observer influence his work, which is rendered all the more difficult by the fact that he must appreciate quantities very inferior to the apparent dimensions of the index and of the image of the object.

The present invention concerns a device for the electrical determination of the position of an object, which eliminates all the above mentioned drawbacks.

This device is characterized by an objective facing the object, by a deflector mounted in an oscillating way behind that objective, by a synchronous oscillator maintaining the oscillations of the deflector, by a grid interposed after the deflector, by a photo-electric cell placed behind the grid, by a relay amplifier connected to this cell, by an instantaneous flash lamp connected with this amplifier, and by an observation organ carrying at least one index and one mark, which organ is lighted by said lamp and driven by a synchronous motor, so that the flux of light resulting from the image of the object to be positioned, projected by the objective and oscillating owing to the deflector, comes to coincide periodically with the slits of the grid and to strike the cell, whose amplified reactions makes the lamp throw flashes of light on the observation organ, the index of the latter appearing, in relation to the mark, in variable position reproducing greatly enlarged the variation of position of the object in relation to the axis of the optical system.

The attached drawings represent schematically, by way of example, an embodiment of the device according to the invention.

Figure 3:
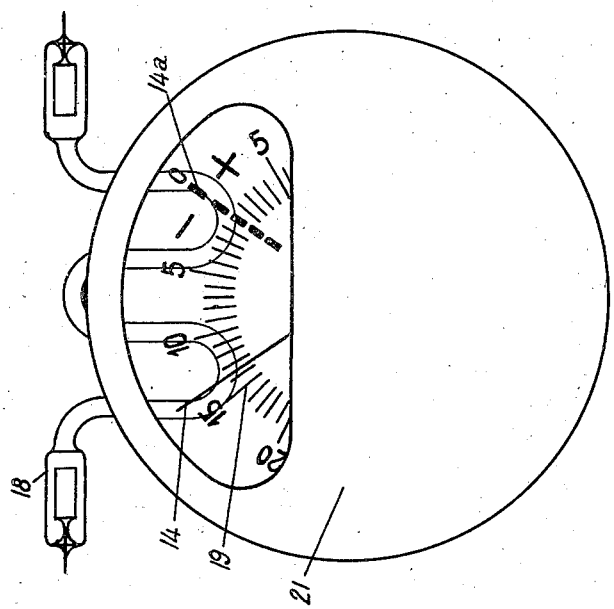
Figure 2:
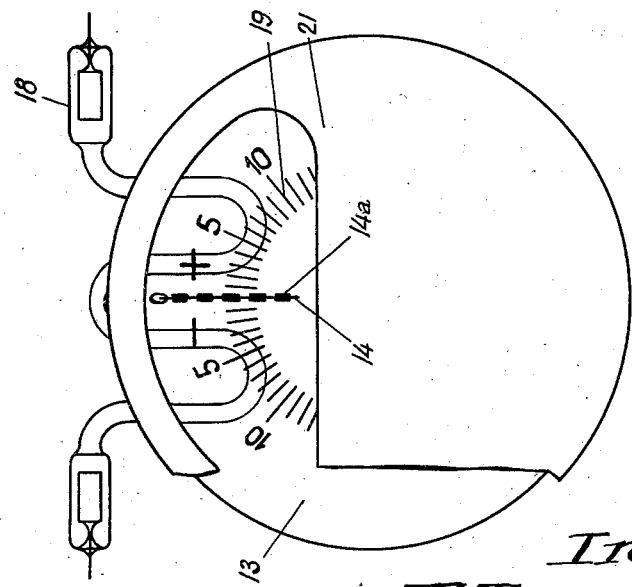

Fig. 1 gives the general wiring diagram and Figs. 2 and 3 represent two positions of the observation organ.

1 is an object such as the slider of a machine carrying a graduation or a precision scale which carries a division 2 whose position can be determined. 3 is the objective of the optical system sighting the division 2. The optical system comprises also a deflecting glass 4 mounted in an oscillating way on the flexible blades 5 and 5a fixed on the terminals 6 and 6a. These terminals, connected to an alternating current distribution network 20, feed the coil 7a wound on the frame 7 of the deflecting glass. The latter oscillates periodically in the air gap of an inductor 8, one pole of which, 8a only is represented.

The optical system comprises also a grid 9 whose apertures correspond to the image of the division 2, and also a photoelectric cell 10 placed behind the grid and connected through an amplifier 11 to an instantaneous action relay 12.

The observation organ is a disk 13, transparent in the described embodiment, and carrying an index 14 and a comparison mark 14a belonging to a division 19. This disk is mounted on a hub 15 fixed on the axis 16 driven by a synchronous motor 17 connected to the network 20. The revolving disk 13 is lighted by a flash lamp 18 fed by the relay 12. A dark room 21 presents an observation window, where appear the index 14 and the comparison mark 14a in the position where they are when they receive, in passing, an instantaneous flash of light.

The operation of the device is as follows:

If the frequency of the flashes of light emitted by the lamp 18 reaches sixteen or more flashes per second, the index 14 and the comparison mark 14a, which are only visible in the momentary position where they are when they receive a flash of light, will be continually visible owing to the retinal persistance and will seem to be stationary, as long as the division 2 will not move in relation to the axis of the optical system.

When the division 2 of the object whose position is to be determined falls with the axis of the optical system, the observation organ presents itself as in Fig. 2, that is to say that the index 14 and the comparison mark 14a seem to be superposed.

When, on the contrary, the division 2 is not centered in relation to the optical axis, the index 14 seems also to move itself in the corresponding direction, and the comparison mark 14a and its division seem to move themselves in the opposite direction, as in Fig. 3.

In fact, when the division 2 of the object to be positioned is centered on the optical axis, the image of the division projected through the oscillating deflector 4 is deviated by an equal amount to the right and to the left of the apertures of the grid 9, with which it coincides exactly during a very short fraction of each half-period of the network 20.

The cell 10 emits a current which is a function of the amount of light which it receives through the apertures of the grid 9. At each coincidence of the image and of these apertures, the light passing through the grid is subjected to a strong quantitative fluctuation, and the current emitted by the cell shows a sudden variation which is amplified in 11 and gives an impulse to the instantaneous action relay 12, so that the lamp 18 throws an instantaneous flash of light.

When the division 2 is centered on the optical axis, the intervals between the successive flashes of light are equal one to the other and the index 14 seems to be superposed to the comparison mark 14a, in appearance, as represented in Fig. 2, because, being diametrically opposed on the disk 13, they are in the same position at each flash.

When, on the contrary, the division 2 gets out of line with the optical axis, the coincidences—and consequently the corresponding flashes of light—occur sooner in the positive half-periods and later in the negative half-periods, or inversely, according to the direction of the misalignment. The index 14 thus also appears sooner in the course of its rotation and it seems to displace itself in reverse direction of the movement of rotation of the disk, whereas the comparison mark 14a and its accompanying division will appear later in the course of their rotation and will seem to displace themselves in the direction of rotation of the disk, as in Fig. 3, or inversely for a misalignment in the opposite direction.

This device permits to bring the enlargement much farther than it is possible with a visual device of the kind of a microscope, because it depends no more of any consideration of optical or physiological nature. The enlargement is actually a function of the ratio of the circumferential speed of the index 14 or of the comparison mark 14a to that of the oscillating movement of the image on the grid. The direct appreciation of the coincidence of the image of the object and of an index being no more effected visually, but by a photoelectric reaction, the personal factor of the observer does not come either any more into account in this appreciation.

The observer looks with the naked eye at an index or a comparison mark whose displacements are considerably amplified in relation to those of the object to be positioned. He observes thus indirectly and without fatigue with an infinitely greater precision.

This device can obviously be applied to other applications than that which has been described. It will find its usefulness in each case where it will be convenient to enlarge considerably in appearance very small dimensions by the help of an optical system whose own enlargement will be amplified by a photoelectric system permitting an indirect observation of the position of the object. Moreover, this device lends itself particularly well to the photographical recording of the position of the object to be positioned by disposing a sensitive plate before the window of the observation organ.

The object of the invention has thus been described and illustrated sufficiently to make it clear to those acquainted with the art.

What is claimed to be new is:

1. In a device for the electrical determination of the position of an object, a photoelectric cell, means for focusing an image of the object, an optical deflector mounted to oscillate in the focal axis of said focusing means between the cell and the object, and an oscillator for imparting oscillations to the deflector.

2. In a device for the electrical determination of a position of an object, a photoelectric cell, means for focusing an image of the object, an optical deflector mounted to oscillate in the focal axis of said focusing means between the cell and the object, an oscillator for imparting oscillations to the deflector, and a grid stationary located between the deflector and the cell.

3. In a device for the electrical determination of the position of an object, means for focusing an image of the object, an optical deflector mounted to oscillate in the focal axis of said focusing means, an oscillator for imparting oscillations to the deflector, a stationary grid located behind the deflector, and a photoelectric cell placed behind the grid.

FERNAND TURRETTINI.